US011243905B1

(12) United States Patent
Heo

(10) Patent No.: US 11,243,905 B1
(45) Date of Patent: Feb. 8, 2022

(54) RISC PROCESSOR HAVING SPECIALIZED DATA PATH FOR SPECIALIZED REGISTERS

(71) Applicant: SHENZHEN GOODIX TECHNOLOGY CO., LTD., Shenzhen (CN)

(72) Inventor: Jaehoon Heo, San Diego, CA (US)

(73) Assignee: SHENZHEN GOODIX TECHNOLOGY CO., LTD., Shenzhen (CN)

(*) Notice: Subject to any disclaimer, the term of this patent is extended or adjusted under 35 U.S.C. 154(b) by 0 days.

(21) Appl. No.: 16/941,485

(22) Filed: Jul. 28, 2020

(51) Int. Cl.
*G06F 15/82* (2006.01)
*G06F 9/30* (2018.01)

(52) U.S. Cl.
CPC .......... *G06F 15/82* (2013.01); *G06F 9/30101* (2013.01)

(58) Field of Classification Search
None
See application file for complete search history.

(56) References Cited

U.S. PATENT DOCUMENTS

| | | | |
|---|---|---|---|
| 6,343,356 B1 | 1/2002 | Pechanek et al. | |
| 6,629,232 B1 * | 9/2003 | Arora | G06F 9/3012 712/23 |
| 6,704,858 B1 * | 3/2004 | Sugimoto | G06F 9/30123 712/228 |
| 7,206,925 B1 * | 4/2007 | Jacobson | G06F 9/30043 712/225 |
| 7,246,218 B2 * | 7/2007 | Prokopenko | G06F 9/3012 712/208 |
| 7,490,208 B1 * | 2/2009 | Yue | G06F 13/372 345/534 |
| 2002/0169944 A1 * | 11/2002 | Babaian | G06F 9/3834 712/204 |
| 2007/0063745 A1 * | 3/2007 | Leijten | G06F 9/3836 327/100 |

(Continued)

FOREIGN PATENT DOCUMENTS

| | | |
|---|---|---|
| CN | 1766834 A | 5/2006 |
| CN | 101403963 A | 4/2009 |

OTHER PUBLICATIONS

Agarwal, P. R., Hardware Synthesis from C with Multiple Register files in Data path, 2003, Dept. of Computer Science and Engr. Indian Institute of Technology Delhi, 114 pages. (Year: 2003).*

*Primary Examiner* — Eric Coleman
(74) *Attorney, Agent, or Firm* — Kilpatrick Townsend & Stockton LLP

(57) ABSTRACT

A data path block circuit is disclosed. The data path block circuit includes a data path circuit having logic circuits, each configured to perform a data path operation to generate a result based on first and second operands. The data path block circuit also includes a first operand multiplexer, having inputs, each connected to one of a first register file, including a quantity of read and write ports, and a second register file, including a different quantity of read and write ports. The data path block circuit also includes a second operand multiplexer, having inputs, each connected to one of the first register file and the second register file. At least one of the first and second operand multiplexers includes a data input connected to the first register file. At least one of the first and second operand multiplexers includes a data input connected to the second register file.

20 Claims, 5 Drawing Sheets

(56) References Cited

U.S. PATENT DOCUMENTS

| | | | | |
|---|---|---|---|---|
| 2007/0239970 | A1* | 10/2007 | Liao | G06F 9/3012 712/225 |
| 2008/0133893 | A1* | 6/2008 | Glew | G06F 9/3826 712/220 |
| 2008/0270750 | A1* | 10/2008 | Khailany | G06F 9/30032 712/24 |
| 2014/0025927 | A1* | 1/2014 | Bradbury | G06F 9/30014 712/204 |
| 2014/0122841 | A1* | 5/2014 | Abernathy | G06F 9/3826 712/225 |
| 2017/0060593 | A1* | 3/2017 | Krishna | G06F 9/384 |
| 2017/0371836 | A1 | 12/2017 | Langhammer | |

* cited by examiner

US 11,243,905 B1

RISC PROCESSOR HAVING SPECIALIZED DATA PATH FOR SPECIALIZED REGISTERS

CROSS-REFERENCE TO RELATED APPLICATIONS

This application is related to U.S. Patent Application titled RISC PROCESSOR HAVING SPECIALIZED REGISTERS, Ser. No. 16/941,499, filed herewith, which is incorporated herein by reference in its entirety for all purposes.

TECHNICAL FIELD

The subject matter described herein relates to a RISC processor architecture, and more particularly to a RISC processor architecture having a data path interacting with specialized registers.

BACKGROUND

RISC processors typically have a number of registers which act as temporary memory storage locations for calculations performed by data path circuits. The registers are used for storing various types of calculation variables for the data path calculations, and are therefore each configured to be used for each type of calculation variable. Because each register is capable of being used for each type of calculation variable, each register is implemented in a register file circuit having all of the features needed for each of the calculation variables. Accordingly, the data path interacts with each type of register file identically. Registers requiring less die area and data paths interacting therewith are needed in the art.

SUMMARY

One inventive aspect is a data path block circuit. The data path block circuit includes a first data path circuit having a plurality of a logic circuits, each configured to receive data to be used as first and second operands, and to perform a data path operation to generate a result based on the first and second operands. The data path block circuit also includes a first operand multiplexer, having a first plurality of data inputs, each connected to one of a first register file, including a first quantity of read and write ports, and a second register file, including a second quantity of read and write ports, where the first quantity of read and write ports is different from the second quantity of read and write ports. The data path block circuit also includes a second operand multiplexer, having a second plurality of data inputs, each connected to one of the first register file, and the second register file, where at least one of the first operand multiplexer and the second operand multiplexer includes a data input connected to the first register file. At least one of the first operand multiplexer and the second operand multiplexer includes a data input connected to the second register file.

In some embodiments, the data path block circuit includes an operation signal port configured to receive an operation signal including data identifying a first read port of one of the first and second register files for the first operand, and a second read port of one of the first and second register files for the second operand, where the first operand multiplexer is configured to receive data identifying the first read port and to select a first data input based on the received data identifying the first read port, and where the second operand multiplexer is configured to receive data identifying the second read port and to select a second data input based on the received data identifying the second read port.

In some embodiments, the first read port is connected to the first register file, and the second read port is connected to the second register file.

In some embodiments, the first operand multiplexer is configured to provide data from the first data input to the first data path circuit as the first operand, and the second operand multiplexer is configured to provide data from the second data input to the first data path circuit as the second operand.

In some embodiments, the operation signal further identifies a particular data path operation of the first data path circuit, and the first data path circuit is configured to select a particular logic circuit based on the operation signal.

In some embodiments, the selected particular logic circuit is configured to perform the particular data path operation on the first and second operands to generate the result.

In some embodiments, the operation signal further identifies a particular write port for the result, and where the first data path circuit is configured to provide the result to the particular write port.

In some embodiments, the first read port is connected to the first register file, and the second read port is connected to the second register file.

In some embodiments, the first read port and the second read port are connected to the first register file, and the particular write port is connected to the second register file.

In some embodiments, the data path block circuit includes a second data path circuit including a plurality of logic circuits, each configured to receive data to be used as third and fourth operands, and to perform a second data path operation to generate a second result based on the third and fourth operands, and an operation signal port configured to receive an operation signal identifying a first read port of one of the first and second register files for the third operand, and a second read port of one of the first and second register files for the fourth operand.

In some embodiments, the first read port is connected to the first register file, and the second read port is connected to the second register file.

In some embodiments, the operation signal further identifies a particular data path operation of the second data path circuit, and the second data path circuit is configured to select a particular logic circuit based on the operation signal.

In some embodiments, the selected particular logic circuit is configured to perform the particular data path operation on the third and fourth operands to generate the result, the operation signal further identifies a particular write port for the result, and the second data path circuit is configured to provide the result to the particular write port.

In some embodiments, the first read port is connected to the first register file, and the second read port is connected to the second register file.

In some embodiments, the first read port and the second read port are connected to the first register file, and the particular write port is connected to the second register file.

Another inventive aspect is a method of using a data path block circuit. The method includes receiving an operation signal including data identifying a first read port of one of first and second register files for a first operand, and identifying a second read port of one of the first and second register files for a second operand, where the first register file includes a first quantity of read and write ports, where the second register file includes a second quantity of read and write ports, and where the first quantity of read and write ports is different from the second quantity of read and write ports. The method also includes, with a first operand multiplexer, receiving data from the operation signal identifying the first read port, with the first operand multiplexer, selecting a first data input based on the received data identifying the first read port, with a second operand multiplexer, receiving data from the operation signal identifying the second read port, with the second operand multiplexer, selecting a second data input based on the received data identifying the second read port, with a logic circuit of a first data path circuit, receiving data from the first and second operand multiplexers to be used as first and second operands, and with the logic circuit, and performing a data path operation to generate a result based on the first and second operands, where at least one of the first operand multiplexer and the second operand multiplexer includes a data input connected to the first register file, and where at least one of the first operand multiplexer and the second operand multiplexer includes a data input connected to the second register file.

In some embodiments, the method also includes, with the first operand multiplexer, providing data from the first data input to the logic circuit as the first operand, and with the second operand multiplexer, providing data from the second data input to the logic circuit as the second operand.

In some embodiments, the operation signal further identifies a particular write port for the result, and the method further includes, with the logic circuit providing the result to the particular write port.

In some embodiments, the first read port is connected to the first register file, and the second read port is connected to the second register file.

In some embodiments, the first read port and the second read port are connected to the first register file, and the particular write port is connected to the second register file.

DESCRIPTION OF DRAWINGS

The accompanying drawings, which are incorporated in and constitute a part of this specification, show certain aspects of the subject matter disclosed herein and, together with the description, help explain some of the principles associated with the disclosed implementations.

When practical, similar reference numbers denote similar structures, features, or elements.

DETAILED DESCRIPTION

Figure 1:
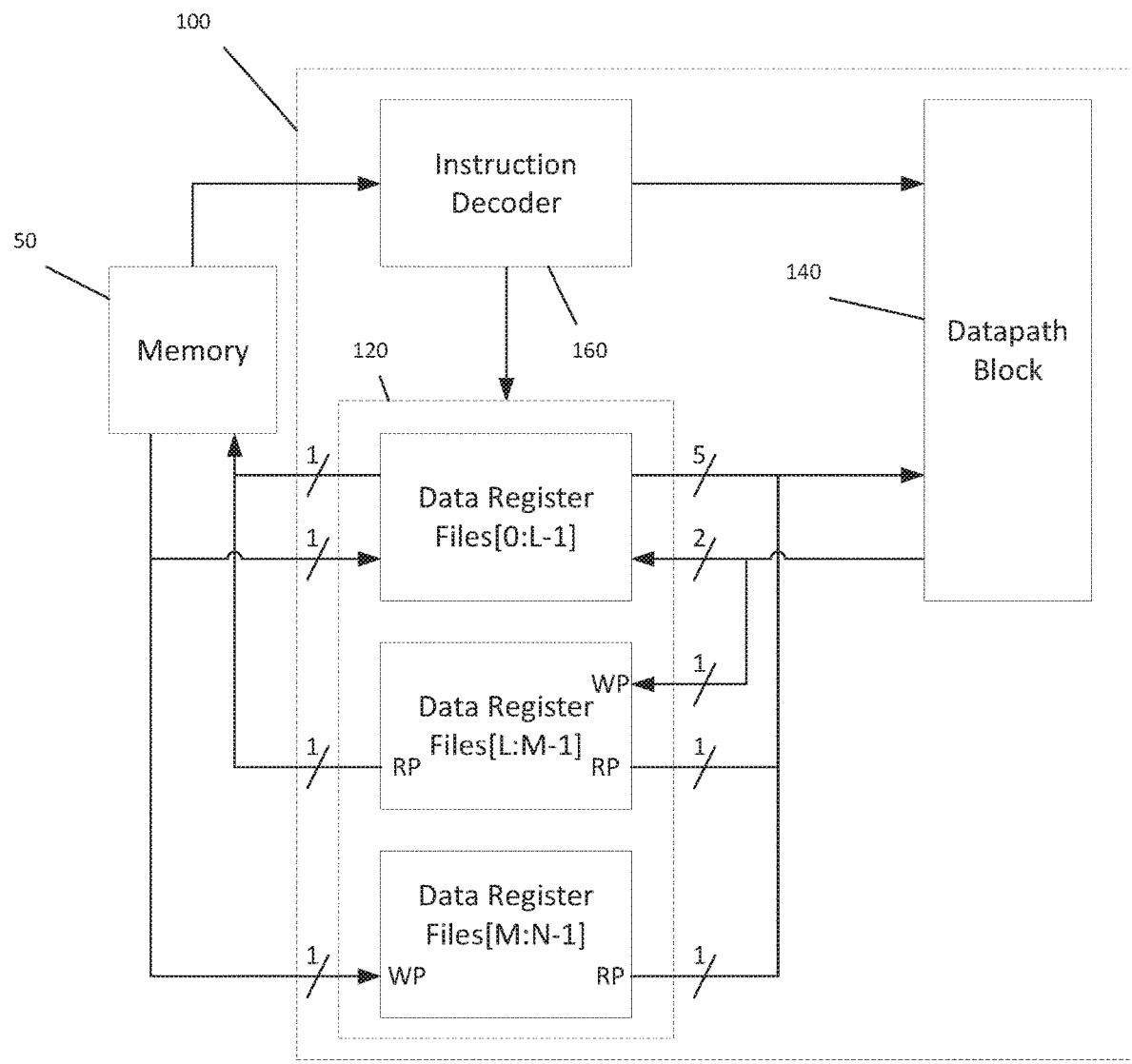
FIG. 1 is a schematic diagram of an embodiment of a processor circuit.

Particular embodiments of the invention are illustrated herein in conjunction with the drawings. Particular embodiments of the invention are illustrated herein in conjunction with the drawings.

Various details are set forth herein as they relate to certain embodiments. However, the invention can also be implemented in ways which are different from those described herein. Modifications can be made to the discussed embodiments by those skilled in the art without departing from the invention. Therefore, the invention is not limited to particular embodiments disclosed herein.

Processor register files interface with data path circuits according to the number of read and write ports the register files have. Embodiments discussed herein disclose a data path circuit which interfaces with specialized register files having specialized numbers of read and write ports.

Processors, such as RISC processors, use a LOAD/CALCULATE/STORE procedure for processing instructions, where data is LOADED into one or more registers, a CALCULATION is performed on the register data using a data path block of a datapath having multiple data path blocks, and calculation results from the data path block are STORED in one or more registers. Read and write access is provided to each register by read and write ports for both the memory and the data path blocks of the datapath. For an implementation, designers determine the number of registers and register files based on trade-offs between, for example, execution speed and circuit die area. In addition, designers determine a number of read and write ports for both the memory and the datapath to be used for the register files. Each register file requires a certain amount of circuit die area and a certain amount of power.

In some embodiments, some register files may be used as general purpose register files, which have a designed number of each port type. In addition, result variable register files may have two read ports and one write port, and constant variable register files may have one port and one write port. In some embodiments, other register files having other port configurations may be used. Because the result variable and constant variable registers use fewer ports, they use less area and less power. Therefore, using these specialized registers in the place of a number of general purpose registers uses less circuit die area and less power for the same number of registers.

Embodiments of data path circuits disclosed herein allow for specialized data path circuits to interface with the specialized register. Embodiments of register files disclosed herein include general purpose register files, that have a determined number of read and write ports for the memory and the datapath, and also have specialized registers, that use a different number of ports according to how each of the registers is to be used.

Data path circuits configured to communicate with multiple types of register files is discussed. Functionality of a particular processor circuit having data register files, an instruction decoder, and a data path block is discussed with reference to FIG. 1. Functionality of particular data path block circuits configured to interface with multiple types of register files having particular port configurations is discussed with reference to FIGS. 2 and 3. Methods of using data path circuits for communicating with multiple types of register files are discussed with reference to FIGS. 4 and 5.

FIG. 1 is a schematic diagram of an embodiment of a processor circuit 100 interfacing with memory 50. Processor circuit 100 includes data register files circuit 120, data path block circuit 140, and instruction decoder circuit 160. As illustrated, in this embodiment, each of the data register files of data register files circuit 120 includes one of:

five read ports and two write ports for interfacing with data path block circuit 140, and one read port and one write port for interfacing with memory 50;

one read port and one write port for interfacing with data path block circuit 140, and one read port for interfacing with memory 50; and one read port for interfacing with data path block circuit 140, and one write port for interfacing with memory 50.

In other embodiments, register files having other numbers of ports interfacing with data path block circuit 140 may be used. In other embodiments, register files having other numbers of ports interfacing with memory 50 may be used. Processor circuit 100 may be used as a portion of a central processing unit (CPU) having other processor circuits known to those of skill in the art. In some embodiments, processor circuits having features other than those specifically discussed herein with reference to processor circuit 100 may be used.

The registers of data register files having five read ports and two write ports for interfacing with data path block circuit 140, and one read port and one write port for interfacing with memory 50 may, for example, be used as general purpose registers.

The registers of data register files having one read port and one write port for interfacing with data path block circuit 140, and one read port for interfacing with memory 50, may, for example be used as result registers, which store results of calculations operations, where the results may be stored in memory 50.

The registers of data register files having one read port for interfacing with data path block circuit 140, and one write port for interfacing with memory 50, may, for example be used as constant registers, which store constants, which do not change for a number of data path instructions. For example, a group of data path instructions may be associated with a loop in the source code compiled to generate the data path instructions, and constant registers may be used to store values of constants which do not change during the execution of the data path instructions associated with the loop.

Memory circuit 50 may be any memory structure, as understood by those of skill in the art. Memory circuit 50 stores at least processing instructions and data. After an instruction and data are received by processor circuit 100, the processor circuit 100 performs operations using the read data based on the read instruction.

Instruction decoder circuit 160 is configured to receive data path instructions from memory circuit 50, where the data path instructions cause data path block circuit 140 to generate a result which is stored in data register files circuit 120. Each data path instruction encodes at least a data path operation to be performed, a result register within data register files circuit 120 where the result of the data path operation is to be stored, and one or more operand registers within data register files circuit 120 which store data to be used as operands for the data path operation. As understood by those of skill in the art, for some data path instructions, the result register where the result of the data path operation is to be stored is the same as an operand register storing data to be used as an operand for the data path operation.

Based on the received data path instructions from memory circuit 50, instruction decoder circuit 160 is configured to generate register signals for data register files circuit 120 which encode the one or more result registers within which one or more results of one or more data path operations are to be stored, a write port for each result register to be used for writing the one or more results of the one or more data path operations to the one or more result registers, the one or more operand registers within data register files circuit 120 which store the data to be used as operands for the one or more data path operations, and a read port for each operand register to be used for reading the operand data therefrom.

In addition, based on the received data path instructions from memory circuit 50, instruction decoder circuit 160 is configured to generate operation signals for data path block circuit 140 which encode the one or more operations to be performed, the write port for each result register to be used for writing the one or more results of the one or more data path operations to the one or more result registers, and the read port for each operand register to be used for reading the operand data therefrom.

Data register files circuit 120 is configured to receive the register signals from instruction decoder circuit 160 which encode the one or more result registers, the write port for each result register to be used for writing the one or more results of the one or more data path operations to the one or more result registers, the one or more operand registers, and the read port for each operand register to be used for reading the operand data therefrom.

Based on the received register signals from instruction decoder circuit 160 which encode the one or more registers which store the data to be used as operands for the one or more data path operations, the data register files circuit 120 generates operand data signals for data path block circuit 140. For example, the register signals may identify a particular register file and a particular register within the particular register file for each of the one or more registers storing data to be used as operands for the one or more data path operations. In response to the register signals, the data from the identified particular registers is read and provided to data path block circuit 140 as the operand data signals.

Based on the received register signals from instruction decoder circuit 160 which identify the read port for each operand register to be used for reading the operand data therefrom, the data register files circuit 120 reads the data from the identified particular registers and provides the data read to the read ports identified in the received register signals.

Data path block 140 is configured to receive the operation signals from instruction decoder circuit 160 which encode the one or more data path operations to be performed. In addition, data path block 140 is configured to receive the operation signals from instruction decoder circuit 160 which identify the read port for each operand data signal to be used for reading the operand data.

Based on the received operation signals, data path block 140 accesses the identified read ports of data register files circuit 120 to receive the operand data signals which encode the data to be used as operands for the one or more data path operations. An embodiment of a data path block circuit is discussed below with reference to FIG. 2, which illustrates an example of a data path block circuit configured to access identified read ports based on a received operation signal.

Data path block 140 comprises a number of logic circuits, each configured to receive a particular number of operands. Each of the logic circuits is also configured to perform a particular data path operation to generate one or more results based on the received operand data signals. For example, data path block 140 may comprise one or more of each of the following logic circuits: shifters, adders, and multipliers. As understood by those of skill in the art, data path block 140 may additionally comprise one or more of each of a number of other logic circuits.

Based on the received operation signals, which encode the one or more data path operations to be performed, data path block 140 selects one or more of the logic circuits. As a result of the selection, the selected logic circuits receive the operand data signals which encode the data to be used as operands for the one or more data path operations.

In response to the operand data signals, the selected logic circuits generate one or more results according to the logic circuitry of the selected logic circuits, as understood by those of skill in the art.

The generated one or more results are provided to data register files circuit 120.

In some embodiments, data path block 140 comprises a number of separate data paths, where each data path comprises a number of each of: shifters, adders, multipliers, and other data path logic circuits. In these embodiments, each data path is used to simultaneously calculate separate results. Accordingly, in these embodiments, the operation signals received by data path block 140 from instruction decoder circuit 160 encode one or more data path operations to be performed with one or more of the separate data paths. In addition, the operand data signals received by data path block 140 from data register files circuit 120 encode the data to be used as operands for the one or more data path operations to be performed with the one or more separate data paths.

Based on the received operation signals from instruction decoder circuit 160 which identify the write port for each result register to be used for writing the one or more results to the one or more result registers of data register files circuit 120, data path block circuit 140 provides the one or more results to the identified one or more write ports of data register files circuit 120. An embodiment of a data path block circuit is discussed below with reference to FIG. 2, which illustrates an example of a data path block circuit configured to provide results to an identified write port based on a received operation signal.

The one or more results provided to the identified write ports of data register files circuit 120 are written to specified registers within the data register files circuit 120 based on the register signals from instruction decoder 160 which identify the one or more result registers within which the one or more results are to be stored, and the write port for each result register to be used for the writing.

In some embodiments, the instruction decoder circuit 160 decodes the one or more data path instructions, the data path block circuit 140 receives the operand data signals from data register files circuit 120 and provides the one or more results to data register files circuit 120, and the one or more results are written to data register files circuit 120 in a single CPU clock cycle. In response to an indication of a new clock cycle, the instruction decoder circuit 160 decodes the one or more data path instructions. In addition, the data path block circuit 140 receives the operation signals from instruction decoder 160, receives the operand data signals from data register files circuit 120, calculates the one or more results, and provides the one or more results to data register files circuit 120, which stores the one or more results in the one or more registers specified in the one or more data path instructions received by instruction decoder circuit 160.

Instruction decoder circuit 160 is also configured to receive memory instructions from memory circuit 50, where the memory instructions cause either data to be read from register files circuit 120 to memory circuit 50 or to be written to register files circuit 120 from memory circuit 50. Each memory instruction encodes at least a memory operation (read from register files circuit 120 or write to register files circuit 120) to be performed, a register within data register files circuit 120 which is read or written, and an address in memory 50.

Based on the received memory instructions from memory circuit 50, instruction decoder circuit 160 is configured to generate register signals for data register files circuit 120 which encode the memory instructions.

Data register files circuit 120 is configured to receive the register signals from instruction decoder circuit 160. Based on the received register signals from instruction decoder circuit 160, the data register files circuit 120 interacts with the memory circuit according to the memory instruction, for example, by reading data from a specified register and writing the read data to memory 50 at a specified address, or by reading data from a specified address in memory 50 and writing the read data to a specified register.

Figure 2:
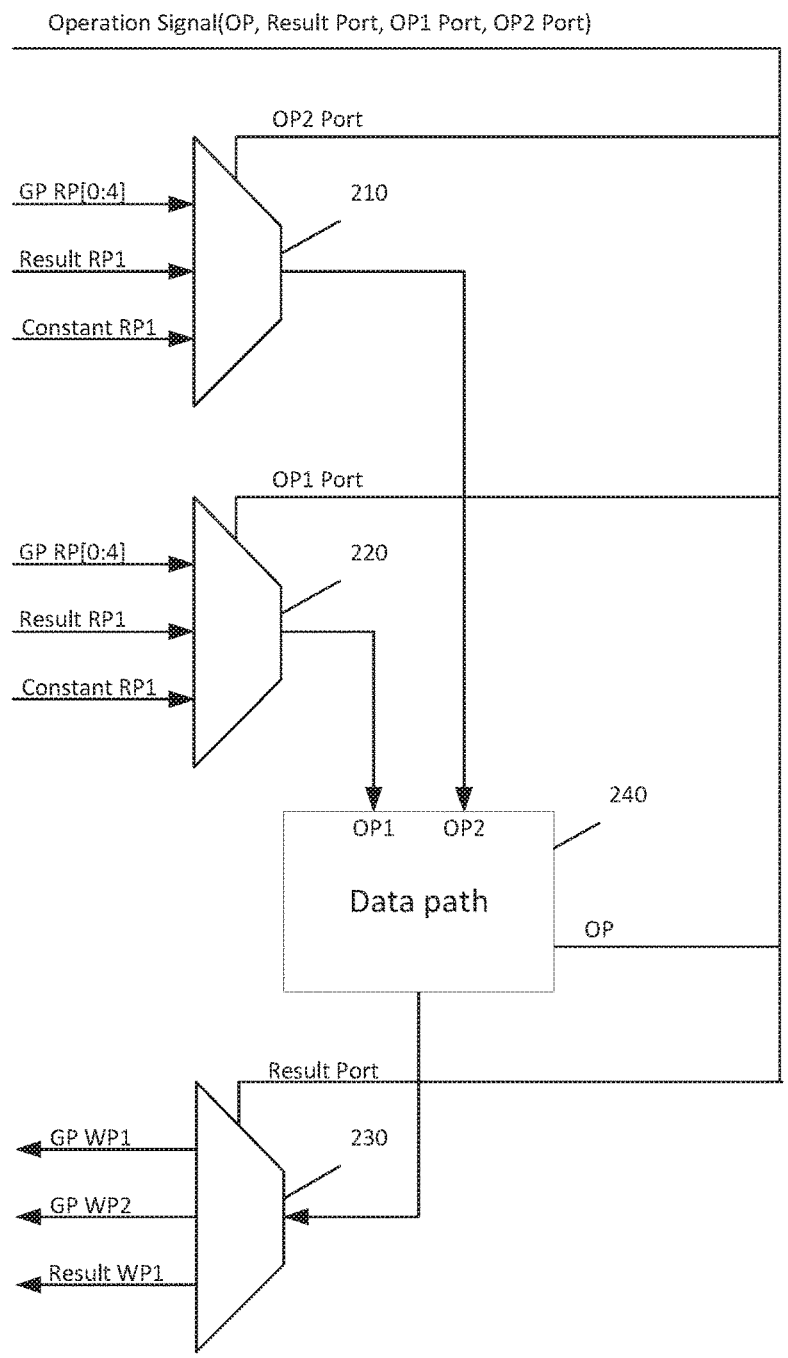
FIG. 2 is a schematic diagram of an embodiment of a data path block circuit which may be used in the processor circuit of FIG. 1.

FIG. 2 is a schematic diagram of an embodiment of a data path block circuit 200. Data path block circuit 200 may be used, for example, as data path block circuit 140 of processor circuit 100 of FIG. 1. Embodiments of processor circuit 100 may use embodiments of other data path block circuits. In addition, embodiments of data path block circuit 200 may be used in other embodiments of processor circuits.

Data path block circuit 200 includes first operand multiplexer 210, second operand multiplexer 220, result multiplexer 230, and data path 240.

Data path block circuit 200 is configured to receive operation signals from, for example, an instruction decoder circuit, such as instruction decoder circuit 160 of FIG. 1. The operation signals encode a data path operation to be performed. The operation signals also identify the read port for each operand data signal to be used for reading the operand data from, for example, a register file, such as those of data register files circuit 120 of FIG. 1.

In the illustrated embodiment, data path block circuit 200 is configured to receive an operation signal comprising an operation identifier OP, a result port signal Result Port, a first operand port signal OP1 Port, and a second operand port signal OP2 Port. The operation identifier OP encodes the operation to be performed by the data path block circuit 200. The result port signal Result Port encodes the register file write port to be used for writing the result to the register file. The first operand port signal OP1 Port encodes the register file to be used for reading the first operand of the operation to be performed by the data path block circuit 200. The second operand port signal OP2 Port encodes the register file to be used for reading the second operand of the operation to be performed by the data path block circuit 200.

As understood by those of skill in the art, some operations require fewer than two operands. For those operations, operation signals include zero or one operand port signals. In addition, as understood by those of skill in the art, some operations require more than two operands. For data path block circuits supporting more than two operands for an instruction, data path block circuit 200 includes one or more additional operand multiplexers, and for instructions requiring more than two operands, the operation signals include more than two (e.g. 3 or 4) operand port signals.

Based on the first operand port signal OP1 Port at its selector input, first operand multiplexer 220 accesses the first read port identified by the first operand port signal OP1 Port, and provides the operand data signal thereon to data path circuit 240 as the first operand input for the operation to be performed by data path circuit 240.

Based on the second operand port signal OP2 Port at its selector input, second operand multiplexer 210 accesses the second read port identified by the second operand port signal OP2 Port, and provides the operand data signal thereon to data path circuit 240 as the second operand input for the operation to be performed by data path circuit 240.

Data path circuit 240 comprises a number of logic circuits, each configured to receive a particular number of operands. Each of the logic circuits is also configured to perform a particular data path operation to generate one or more results based on the received operand data signals. For example, data path circuit 240 may comprise one or more of each of the following logic circuits: shifters, adders, and multipliers. As understood by those of skill in the art, data path circuit 240 may additionally comprise one or more of each of a number of other logic circuits.

Based on the operation identifier OP, which encodes the data path operation to be performed, data path circuit 240 selects one or more of the logic circuits. As a result of the selection, the selected logic circuits receive the first and second operands which encode the data to be used as operands for the data path operation.

In response to the first and second operands, the selected logic circuits generate a result according to the logic circuitry of the selected logic circuit, as understood by those of skill in the art. The generated result is provided to result multiplexer 230.

Based on the result port signal Result Port at its selector input, because result port signal Result Port encodes the register file write port to be used for writing the result to the register file, result multiplexer 230 provides the result to the identified write port of the register file.

The result provided to the identified write port of the register file is written to specified register within the register file.

In alternative embodiments, some logic circuits generate more than one result. Embodiments of data path block circuits which accommodate logic circuits which generate more than one result have one or more additional result multiplexers which each receive an additional result, and provide the received result to one identified write port of the available write ports, where the identification is included in an additional result port signal in the operation signal.

In the embodiment of FIG. 2, each operand multiplexer has an input for the read ports of each of the register files circuits. In alternative embodiments, one or more operand multiplexers don't have inputs a particular type of register file. For example, in some embodiments, all of the data inputs of one or more operand multiplexers are connected to either general purpose register files or result register files. Additionally or alternatively, in some embodiments, all of the data inputs of one or more operand multiplexers are connected to either general purpose register files or constant register files. Additionally or alternatively, in some embodiments, all of the data inputs of one or more operand multiplexers are connected to either result register files or constant register files. In some embodiments, one or more operand multiplexers have inputs only for a particular type of register file. For example, in some embodiments, all of the data inputs of one or more operand multiplexers are connected to general purpose register files. Additionally or alternatively, in some embodiments, all of the data inputs of one or more operand multiplexers are connected to result register files. Additionally or alternatively, in some embodiments, all of the data inputs of one or more operand multiplexers are connected to constant register files.

In some embodiments, data path circuits use different read ports for different operands. In some embodiments, the operands for one or more operations are assigned to or are selectively connectable to a first set of read ports, and other operands for one or more operations are assigned to or are selectively connectable to a second set of read ports. In some embodiments, the first and second sets overlap. In some embodiments, the first and second sets are non-overlapping.

Figure 3:
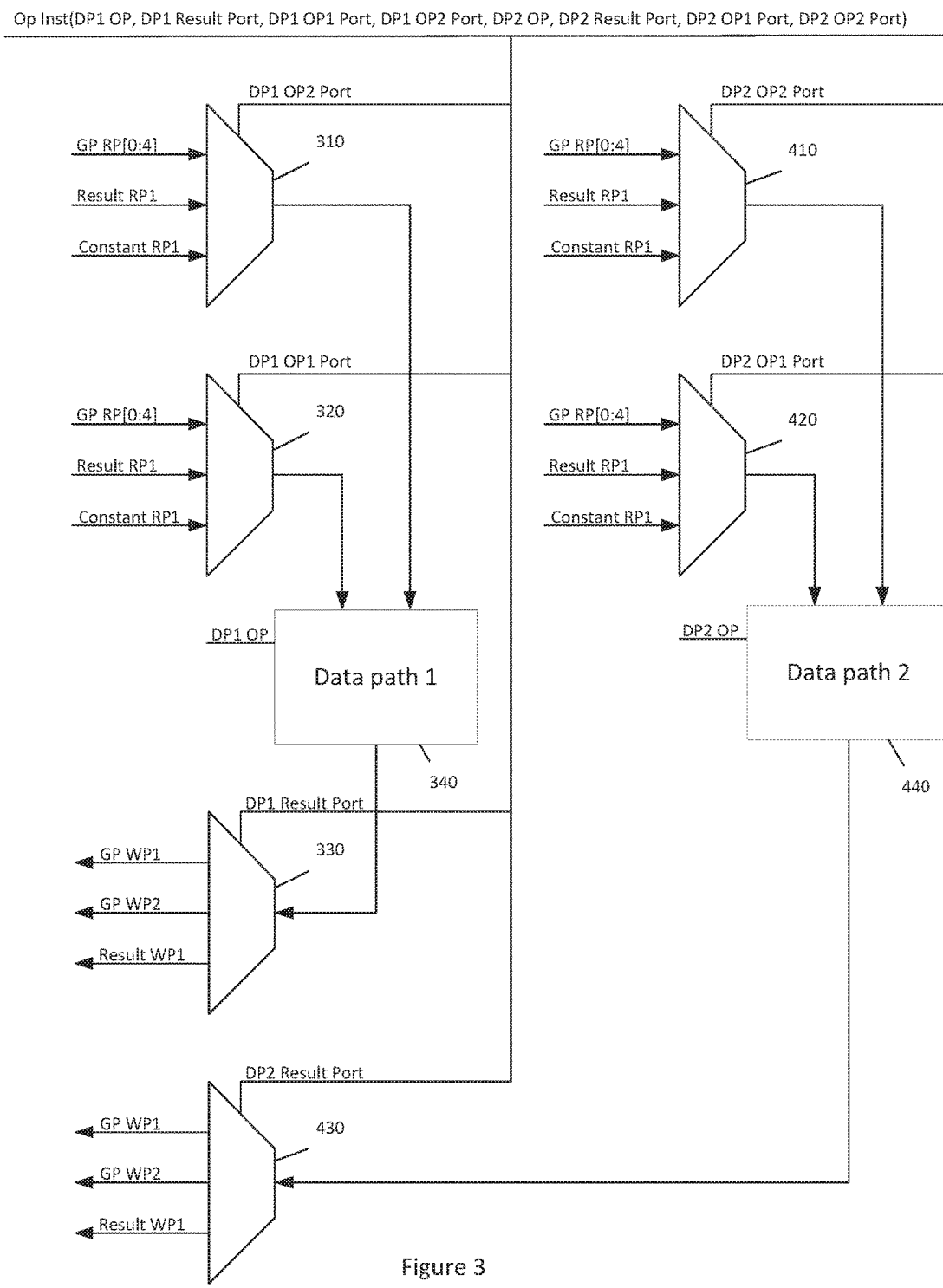
FIG. 3 is a schematic diagram of an embodiment of a data path block circuit which may be used in the processor circuit of FIG. 1.

FIG. 3 is a schematic diagram of an embodiment of a data path block circuit 300. Data path block circuit 300 may be used, for example, as data path block circuit 140 of processor circuit 100 of FIG. 1. Embodiments of processor circuit 100 may use embodiments of other data path block circuits. In addition, embodiments of data path block circuit 300 may be used in other embodiments of processor circuits.

Data path block circuit 300 includes first data path 340 and second data path 440. Data path block circuit 300 also includes first operand multiplexer 310, second operand multiplexer 320, and result multiplexer 330 for first data path 340. Data path block circuit 300 also includes first operand multiplexer 410, second operand multiplexer 420, and result multiplexer 430 for second data path 440.

Data path block circuit 300 is configured to receive operation signals from, for example, an instruction decoder circuit, such as instruction decoder circuit 160 of FIG. 1. The operation signals encode one or more data path operations to be performed. The operation signals also identify the read port for each operand data signal to be used for reading the operand data from, for example, a register file, such as those of data register files circuit 120 of FIG. 1.

In the illustrated embodiment, data path block circuit 300 is configured to receive an operation signal comprising an operation identifier DP1 OP, a result port signal DP1 Result Port, a first operand port signal DP1 OP1 Port, a second operand port signal DP1 OP2 Port, an operation identifier DP2 OP, a result port signal DP2 Result Port, a first operand port signal DP2 OP1 Port, and a second operand port signal DP2 OP2 Port.

The operation identifier DP1 OP encodes the operation to be performed by the first data path 340. The result port signal DP1 Result Port encodes the register file write port to be used for writing the result of the operation to be performed by the first data path 340 to the register file. The first operand port signal DP1 OP1 Port encodes the register file to be used for reading the first operand of the operation to be performed by the first data path 340. The second operand port signal DP1 OP2 Port encodes the register file to be used for reading the second operand of the operation to be performed by the first data path 340.

The operation identifier DP2 OP encodes the operation to be performed by the second data path 440. The result port signal DP2 Result Port encodes the register file write port to be used for writing the result of the operation to be performed by the second data path 440 to the register file. The first operand port signal DP2 OP1 Port encodes the register file to be used for reading the first operand of the operation to be performed by the second data path 440. The second operand port signal DP2 OP2 Port encodes the register file to be used for reading the second operand of the operation to be performed by the second data path 440.

As understood by those of skill in the art, some operations require fewer than two operands. For those operations, operation signals include zero or one operand port signals. In addition, as understood by those of skill in the art, some operations require more than two operands. For data path block circuits supporting more than two operands for an instruction, data path block circuit 300 includes one or more additional operand multiplexers, and for instructions requiring more than two operands, the operation signals include more than two (e.g. 3 or 4) operand port signals.

Based on the first operand port signal DP1 OP1 Port at its selector input, first operand multiplexer 320 accesses the first read port identified by the first operand port signal DP1 OP1 Port, and provides the operand data signal thereon to first data path circuit 340 as the first operand input for the operation to be performed by first data path circuit 340.

Based on the second operand port signal DP1 OP2 Port at its selector input, second operand multiplexer 310 accesses the second read port identified by the second operand port signal DP1 OP2 Port, and provides the operand data signal thereon to first data path circuit 340 as the second operand input for the operation to be performed by first data path circuit 340.

Based on the first operand port signal DP2 OP1 Port at its selector input, first operand multiplexer 420 accesses the first read port identified by the first operand port signal DP2 OP1 Port, and provides the operand data signal thereon to first data path circuit 440 as the first operand input for the operation to be performed by first data path circuit 440.

Based on the second operand port signal DP2 OP2 Port at its selector input, second operand multiplexer 410 accesses the second read port identified by the second operand port signal DP2 OP2 Port, and provides the operand data signal thereon to second data path circuit 440 as the second operand input for the operation to be performed by second data path circuit 440.

First data path circuit 340 comprises a number of logic circuits, each configured to receive a particular number of operands. Each of the logic circuits is also configured to perform a particular data path operation to generate one or more results based on the received operand data signals. For example, first data path circuit 340 may comprise one or more of each of the following logic circuits: shifters, adders, and multipliers. As understood by those of skill in the art, first data path circuit 340 may additionally comprise one or more of each of a number of other logic circuits.

Based on the operation identifier DP1 OP, which encodes the data path operation to be performed by the first data path circuit 340, first data path circuit 340 selects one or more of the logic circuits. As a result of the selection, the selected logic circuits receive the first and second operands from first and second multiplexer circuits 310 and 320, where the first and second operands encode the data to be used as operands for the selected first data path operation logic circuits.

In response to the first and second operands from the first and second multiplexer circuits 310 and 320, the selected logic circuits of the first data path circuit 340 generate a first result according to the logic circuitry of the selected logic circuit, as understood by those of skill in the art. The generated first result is provided to result multiplexer 330.

Second data path circuit 440 comprises a number of logic circuits, each configured to receive a particular number of operands. Each of the logic circuits is also configured to perform a particular data path operation to generate one or more results based on the received operand data signals. For example, second data path circuit 440 may comprise one or more of each of the following logic circuits: shifters, adders, and multipliers. As understood by those of skill in the art, second data path circuit 440 may additionally comprise one or more of each of a number of other logic circuits.

Based on the operation identifier DP2 OP, which encodes the data path operation to be performed by the second data path circuit 440, second data path circuit 440 selects one or more of the logic circuits. As a result of the selection, the selected logic circuits receive the first and second operands from first and second multiplexer circuits 410 and 420, where the first and second operands encode the data to be used as operands for the selected second data path operation logic circuits.

In response to the first and second operands from the first and second multiplexer circuits 410 and 420, the selected logic circuits of the second data path circuit 440 generate a second result according to the logic circuitry of the selected logic circuit, as understood by those of skill in the art. The generated second result is provided to result multiplexer 430.

Based on the result port signal DP1 Result Port at its selector input, because result port signal DP1 Result Port encodes the register file write port to be used for writing the result of the data path operation performed by the first data path circuit 340 to the register file, result multiplexer 330 provides the first result to the identified write port of the register file. Based on the result port signal DP2 Result Port at its selector input, because result port signal DP2 Result Port encodes the register file write port to be used for writing the result of the data path operation to be performed by the second data path circuit 440 to the register file, result multiplexer 430 provides the second result to the identified write port of the register file.

The first and second results provided to the identified write ports of the register file are written to specified registers within the register file.

As understood by those of skill in the art, some logic circuits generate more than one result. Embodiments of data path block circuits which accommodate logic circuits which generate more than one result have one or more additional result multiplexers which each receive an additional result, and provide the received result to one identified write port of the available write ports, where the identification is included in an additional result port signal in the operation signal.

Figure 4:
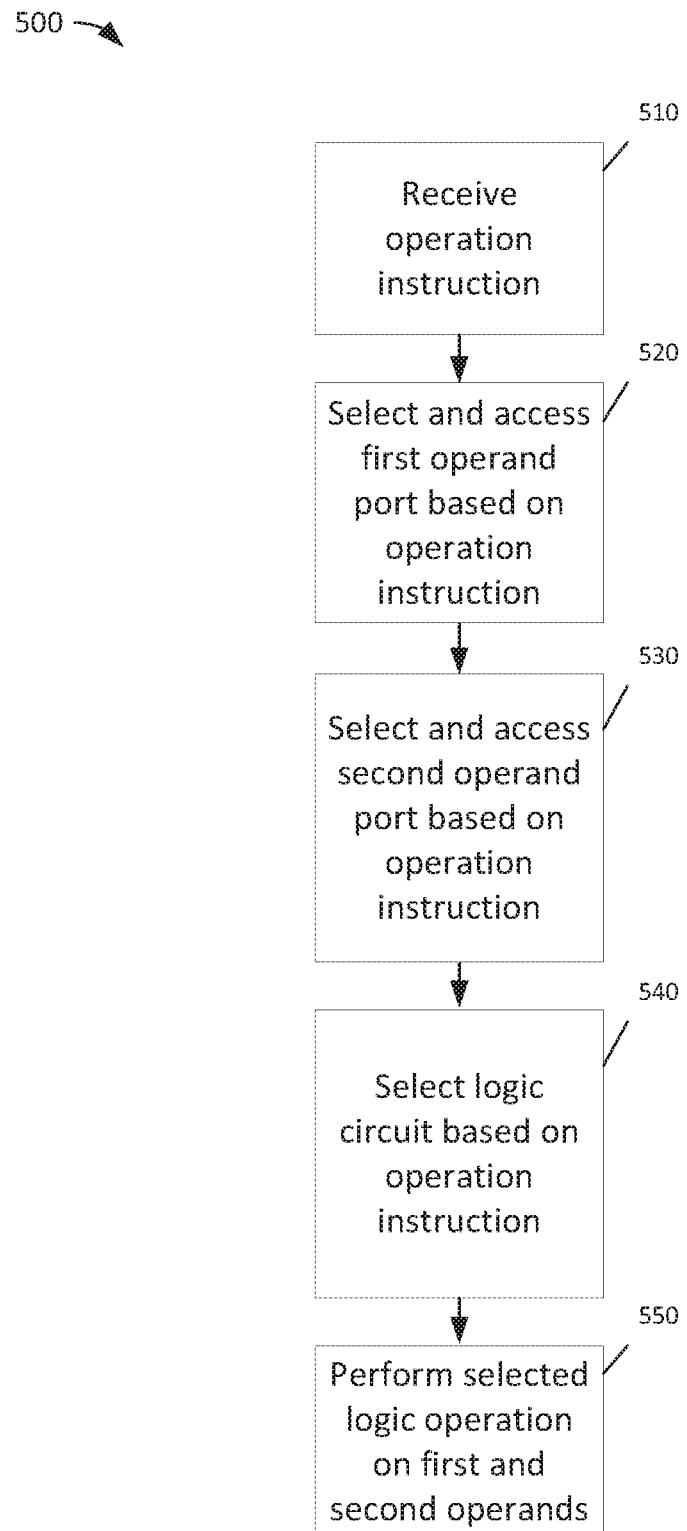
FIG. 4 is a flowchart diagram illustrating a method 500 of using a data path block circuit.

FIG. 4 is a flowchart diagram illustrating a method 500 of using a data path block circuit. The method 500 may be performed, for example, by or with processor circuit 100 of FIG. 1. The method 500 may be performed, for example, by or with either of data path block circuits 200 of FIG. 2 and 300 of FIG. 3.

At 510, the data path block circuit receives an operation signal from, for example, an instruction decoder circuit, such as instruction decoder circuit 160 of FIG. 1. The operation signal encodes a data path operation to be performed. The operation signal also identifies the read port for each operand data signal to be used for reading the operand data from, for example, a register file, such as those of data register files circuit 120 of FIG. 1.

For example, the data path block circuit may receive an operation signal comprising an operation identifier OP, a result port signal Result Port, a first operand port signal OP1 Port, and a second operand port signal OP2 Port. The operation identifier OP encodes the operation to be performed by the data path block circuit. The result port signal Result Port encodes the register file write port to be used for writing the result to the register file. The first operand port signal OP1 Port encodes the register file to be used for reading the first operand of the operation to be performed by the data path block circuit. The second operand port signal OP2 Port encodes the register file to be used for reading the second operand of the operation to be performed by the data path block circuit.

At 520, with a first multiplexer, a read port identified by the first operand port signal OP1 Port is accessed and provides the operand data signal thereon to a data path circuit as the first operand input for the operation to be performed by the data path circuit.

At 530, with a second multiplexer, a read port identified by the second operand port signal OP2 Port is accessed and provides the operand data signal thereon to a data path circuit as the second operand input for the operation to be performed by the data path circuit.

At 540, a logic circuit of the data path circuit is selected based on the operation identifier OP, where the selected logic circuit corresponds with the function of the operation identifier OP. As a result of the selection, the selected logic circuit receives the first and second operands which encode the data to be used as operands for the data path operation of the selected logic circuit.

At 550, the selected logic circuit generates a result based on the first and second operands according to the logic circuitry of the selected logic circuit, as understood by those of skill in the art.

The method 500 may be performed by a data path block circuit having multiple data paths, such as data path block circuit 300, which has first data path 340 and second data path 440. For example, with reference to data path block circuit 300, first operand multiplexer 310, second operand multiplexer 320, first data path 340, and result multiplexer 330 may or may be used to perform method 500. In addition, first operand multiplexer 410, second operand multiplexer 420, second data path 440, and result multiplexer 430 also may or may be used to perform the method 500. In some embodiments, first operand multiplexer 310, second operand multiplexer 320, first data path 340, and result multiplexer 330 perform or are used to perform the method 500, while first operand multiplexer 410, second operand multiplexer 420, second data path 440, and result multiplexer 430 also perform or are used to perform the method 500, such that the method 500 is performed for both first data path circuit 340 and second data path circuit 440 concurrently. In some embodiments, the method 500 is performed for both first data path circuit 340 and second data path circuit 440 serially or consecutively.

In some embodiments, all of the actions discussed with reference to FIG. 4 occur within a single calculation cycle. For example, all of the actions discussed with reference to FIG. 4 occur within a single CPU clock cycle.

Figure 5:
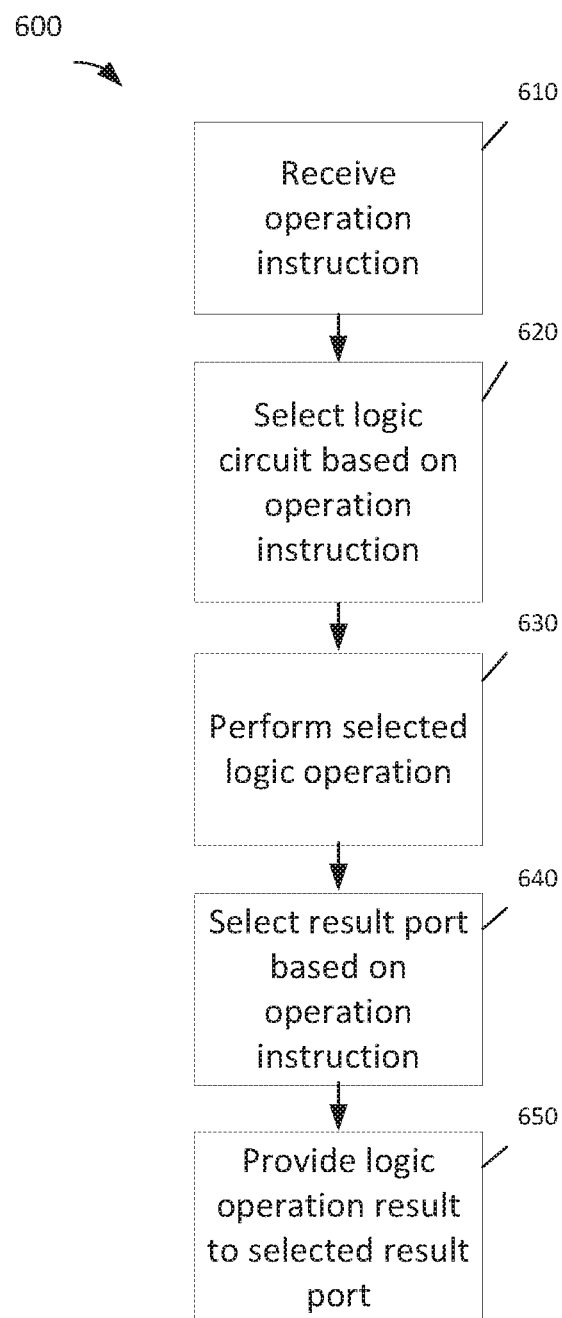
FIG. 5 is a flowchart diagram illustrating a method 600 of using a data path block circuit.

FIG. 5 is a flowchart diagram illustrating a method 600 of using a data path block circuit. The method 600 may be performed, for example, by or with processor circuit 100 of FIG. 1. The method 600 may be performed, for example, by or with either of data path block circuits 200 of FIG. 2 and 300 of FIG. 3.

At 610, the data path block circuit receives an operation signal from, for example, an instruction decoder circuit, such as instruction decoder circuit 160 of FIG. 1. The operation signal encodes a data path operation to be performed. The operation signal also identifies the read port for each operand data signal to be used for reading the operand data from, for example, a register file, such as those of data register files circuit 120 of FIG. 1.

For example, the data path block circuit may receive an operation signal comprising an operation identifier OP, a result port signal Result Port, a first operand port signal OP1 Port, and a second operand port signal OP2 Port. The operation identifier OP encodes the operation to be performed by the data path block circuit. The result port signal Result Port encodes the register file write port to be used for writing the result to the register file. The first operand port signal OP1 Port encodes the register file to be used for reading the first operand of the operation to be performed by the data path block circuit. The second operand port signal OP2 Port encodes the register file to be used for reading the second operand of the operation to be performed by the data path block circuit.

At 620, a logic circuit of the data path circuit is selected based on the operation identifier OP, where the selected logic circuit corresponds with the function of the operation identifier OP. As a result of the selection, the selected logic circuit receives the first and second operands which encode the data to be used as operands for the data path operation of the selected logic circuit.

At 630, the selected logic circuit generates a result based on the first and second operands according to the logic circuitry of the selected logic circuit, as understood by those of skill in the art.

At 640, with a multiplexer, a write port identified by the result port signal Result Port is accessed, and at 650, the result generated by the selected logic circuit is provided to the accessed write port.

The method 600 may be performed by a data path block circuit having multiple data paths, such as data path block circuit 300, which has first data path 340 and second data path 440. For example, with reference to data path block circuit 300, first operand multiplexer 310, second operand multiplexer 320, first data path 340, and result multiplexer 330 may or may be used to perform method 600. In addition, first operand multiplexer 410, second operand multiplexer 420, second data path 440, and result multiplexer 430 also may or may be used to perform the method 600. In some embodiments, first operand multiplexer 310, second operand multiplexer 320, first data path 340, and result multiplexer 330 perform or are used to perform the method 600, while first operand multiplexer 410, second operand multiplexer 420, second data path 440, and result multiplexer 430 also perform or are used to perform the method 600, such that the method 600 is performed for both first data path circuit 340 and second data path circuit 440 concurrently. In some embodiments, the method 600 is performed for both first data path circuit 340 and second data path circuit 440 serially or consecutively.

In some embodiments, all of the actions discussed with reference to FIG. 5 occur within a single calculation cycle. For example, all of the actions discussed with reference to FIG. 5 occur within a single CPU clock cycle.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." Use of the term "based on," above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A data path block circuit, comprising:
   a first data path circuit comprising a plurality of a logic circuits, each configured to receive data to be used as first and second operands, and to perform a data path operation to generate a result based on the first and second operands;
   a first operand multiplexer, comprising:
      a first plurality of data inputs, each connected to one of:
         a first register file, comprising a first quantity of read ports and a second quantity of write ports, and
         a second register file, comprising a third quantity of read ports and a fourth quantity of write ports,
         wherein the first quantity of read ports is different from the third quantity of read ports, and wherein the second quantity of write ports is different from the fourth quantity of write ports; and
   a second operand multiplexer, comprising:
      a second plurality of data inputs, each connected to one of:
         the first register file, and
         the second register file,
   wherein at least one of the first operand multiplexer and the second operand multiplexer comprises a data input connected to the first register file, and
   wherein at least one of the first operand multiplexer and the second operand multiplexer comprises a data input connected to the second register file.

2. The data path block circuit of claim 1, further comprising an operation signal port configured to receive an operation signal comprising data identifying a first read port of one of the first and second register files for the first operand, and a second read port of one of the first and second register files for the second operand, wherein the first operand multiplexer is configured to receive data identifying the first read port and to select a first data input based on the received data identifying the first read port, and wherein the second operand multiplexer is configured to receive data identifying the second read port and to select a second data input based on the received data identifying the second read port.

3. The data path block circuit of claim 2, wherein the first read port is connected to the first register file, and wherein the second read port is connected to the second register file.

4. The data path block circuit of claim 2, wherein the first operand multiplexer is configured to provide data from the first data input to the first data path circuit as the first operand, and wherein the second operand multiplexer is configured to provide data from the second data input to the first data path circuit as the second operand.

5. The data path block circuit of claim 4, wherein the operation signal further identifies a particular data path operation of the first data path circuit, wherein the first data path circuit is configured to select a particular logic circuit based on the operation signal.

6. The data path block circuit of claim 5, wherein the selected particular logic circuit is configured to perform the particular data path operation on the first and second operands to generate the result.

7. The data path block circuit of claim 6, wherein the operation signal further identifies a particular write port for the result, and wherein the first data path circuit is configured to provide the result to the particular write port.

8. The data path block circuit of claim 7, wherein the first read port is connected to the first register file, and wherein the second read port is connected to the second register file.

9. The data path block circuit of claim 7, wherein the first read port and the second read port are connected to the first register file, and wherein the particular write port is connected to the second register file.

10. The data path block circuit of claim 1, further comprising:
    a second data path circuit comprising a plurality of logic circuits, each configured to receive data to be used as third and fourth operands, and to perform a second data path operation to generate a second result based on the third and fourth operands; and
    an operation signal port configured to receive an operation signal identifying a first read port of one of the first and second register files for the third operand, and a second read port of one of the first and second register files for the fourth operand.

11. The data path block circuit of claim 10, wherein the first read port is connected to the first register file, and wherein the second read port is connected to the second register file.

12. The data path block circuit of claim 10, wherein the operation signal further identifies a particular data path operation of the second data path circuit, wherein the second data path circuit is configured to select a particular logic circuit based on the operation signal.

13. The data path block circuit of claim 12, wherein the selected particular logic circuit is configured to perform the particular data path operation on the third and fourth operands to generate the result, wherein the operation signal further identifies a particular write port for the result, and wherein the second data path circuit is configured to provide the result to the particular write port.

14. The data path block circuit of claim 13, wherein the first read port is connected to the first register file, and wherein the second read port is connected to the second register file.

15. The data path block circuit of claim 13, wherein the first read port and the second read port are connected to the first register file, and wherein the particular write port is connected to the second register file.

16. A method of using a data path block circuit, the method comprising:
    receiving an operation signal comprising data identifying a first read port of one of first and second register files for a first operand, and identifying a second read port of one of the first and second register files for a second operand, wherein the first register file comprises a first quantity of read ports and a second quantity of write ports, wherein the second register file comprises a third quantity of read ports and a fourth quantity of write ports, and wherein the first quantity of read ports is different from the third quantity of read ports, and wherein the second quantity of write ports is different from the fourth quantity of write ports;
    with a first operand multiplexer, receiving data from the operation signal identifying the first read port;

with the first operand multiplexer, selecting a first data input based on the received data identifying the first read port;
with a second operand multiplexer, receiving data from the operation signal identifying the second read port;
with the second operand multiplexer, selecting a second data input based on the received data identifying the second read port;
with a logic circuit of a first data path circuit, receiving data from the first and second operand multiplexers to be used as first and second operands; and
with the logic circuit, performing a data path operation to generate a result based on the first and second operands,
wherein at least one of the first operand multiplexer and the second operand multiplexer comprises a data input connected to the first register file, and
wherein at least one of the first operand multiplexer and the second operand multiplexer comprises a data input connected to the second register file.

17. The method of claim 16, further comprising:
with the first operand multiplexer, providing data from the first data input to the logic circuit as the first operand; and
with the second operand multiplexer, providing data from the second data input to the logic circuit as the second operand.

18. The method of claim 16, wherein the operation signal further identifies a particular write port for the result, and wherein the method further comprises, with the logic circuit providing the result to the particular write port.

19. The method of claim 18, wherein the first read port is connected to the first register file, and wherein the second read port is connected to the second register file.

20. The method of claim 18, wherein the first read port and the second read port are connected to the first register file, and wherein the particular write port is connected to the second register file.

* * * * *